(12) United States Patent
Longoni et al.

(10) Patent No.: US 8,393,437 B2
(45) Date of Patent: Mar. 12, 2013

(54) NOISE AND VIBRATION MITIGATION SYSTEM FOR NUCLEAR REACTORS EMPLOYING AN ACOUSTIC SIDE BRANCH RESONATOR

(75) Inventors: Gianluca Longoni, Pittsburgh, PA (US); Younus Munsi, Cheswick, PA (US); Robert C. Theuret, Pittsburgh, PA (US); David R. Forsyth, Cheswick, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 193 days.

(21) Appl. No.: 13/027,322

(22) Filed: Feb. 15, 2011

(65) Prior Publication Data

US 2012/0206011 A1 Aug. 16, 2012

(51) Int. Cl.
- F01N 1/02 (2006.01)
- F01N 1/04 (2006.01)
- F01N 1/08 (2006.01)
- F01N 1/00 (2006.01)

(52) U.S. Cl. ........................................ 181/250; 181/276

(58) Field of Classification Search .................. 181/250, 181/266, 273, 276, 258, 233, 252, 256, 230; 138/40, 41; 137/13, 593; 123/184.57
See application file for complete search history.

(56) References Cited

U.S. PATENT DOCUMENTS

| | | | | |
|---|---|---|---|---|
| 821,828 A * | 5/1906 | Phelps | ............................ | 181/258 |
| 1,419,606 A * | 6/1922 | Benedict | ........................ | 181/242 |
| 2,233,804 A * | 3/1941 | Bourne | ............................ | 181/233 |
| 2,297,046 A * | 9/1942 | Bourne | ............................ | 181/250 |
| 2,486,133 A * | 10/1949 | Egger | ................................ | 138/41 |
| 2,840,179 A * | 6/1958 | Junger | ............................ | 181/286 |
| 3,422,853 A * | 1/1969 | Schmid | ............................. | 138/30 |
| 3,724,502 A * | 4/1973 | Hayner et al. | ................... | 138/41 |
| 3,776,364 A * | 12/1973 | Van Doeren | ................... | 181/228 |
| 3,783,969 A | 1/1974 | Pall | | |
| 3,837,426 A * | 9/1974 | Kleinschmidt | ............... | 181/285 |
| 4,032,398 A * | 6/1977 | Cross et al. | .................... | 376/443 |
| 4,093,110 A * | 6/1978 | Johnson | ............................ | 227/9 |
| 4,102,359 A * | 7/1978 | Patel | ................................ | 138/42 |
| 4,135,603 A * | 1/1979 | Dean et al. | ..................... | 181/286 |
| 4,324,314 A * | 4/1982 | Beach et al. | ................... | 181/230 |
| 4,530,418 A * | 7/1985 | Currie | ............................ | 181/227 |
| 4,562,036 A * | 12/1985 | Shin et al. | ....................... | 376/283 |
| 4,562,901 A * | 1/1986 | Junger et al. | ................... | 181/285 |
| 4,842,811 A | 6/1989 | Desilva | | |
| 5,141,710 A | 8/1992 | Stirn et al. | | |
| 5,384,814 A | 1/1995 | Matzner et al. | | |
| 5,390,221 A | 2/1995 | Dix et al. | | |
| 5,493,080 A * | 2/1996 | Moss | ............................. | 181/232 |
| 5,740,837 A * | 4/1998 | Chiang | ............................. | 138/45 |
| 5,742,654 A | 4/1998 | Morris | | |
| 6,109,387 A * | 8/2000 | Boretti | .......................... | 181/230 |

(Continued)

FOREIGN PATENT DOCUMENTS

EP 76893 A1 * 4/1983

*Primary Examiner* — Edgardo San Martin

(57) ABSTRACT

A method of designing/making an acoustic side branch resonator structured to be coupled to a standpipe of, for example, a nuclear power plant, wherein the acoustic side branch resonator includes a plurality of wire mesh elements for damping purposes. The method includes determining a resonant frequency of the standpipe, determining an active length of the acoustic side branch resonator using the resonant frequency, and determining a particular number of the wire mesh elements to be used in the acoustic side branch resonator and a pitch of each of the wire mesh elements using momentum and continuity equations of a compressible fluid.

17 Claims, 3 Drawing Sheets

U.S. PATENT DOCUMENTS

| | | | |
|---|---|---|---|
| 6,167,985 B1 * | 1/2001 | Van Ligten | 181/286 |
| 6,926,117 B2 * | 8/2005 | Sterling | 181/230 |
| 7,185,678 B1 * | 3/2007 | Stell et al. | 138/41 |
| 7,730,997 B2 * | 6/2010 | Asada et al. | 181/270 |
| 7,789,194 B2 * | 9/2010 | Lathrop et al. | 181/225 |
| 7,848,475 B2 | 12/2010 | Kaufman et al. | |
| 7,905,321 B2 * | 3/2011 | Ballard, III | 181/258 |
| 2004/0050618 A1 * | 3/2004 | Marocco | 181/248 |
| 2004/0140149 A1 * | 7/2004 | Terpay et al. | 181/233 |
| 2005/0194207 A1 * | 9/2005 | Nemit et al. | 181/250 |
| 2008/0149201 A1 | 6/2008 | Sommerville et al. | |
| 2009/0145688 A1 * | 6/2009 | Marcoux | 181/252 |

\* cited by examiner

NOISE AND VIBRATION MITIGATION SYSTEM FOR NUCLEAR REACTORS EMPLOYING AN ACOUSTIC SIDE BRANCH RESONATOR

BACKGROUND OF THE INVENTION

1. Field of the Invention

The present invention relates to nuclear power plants, such as, without limitation, boiling water reactor (BWR) type nuclear power plants, and in particular to a system for mitigating potentially damaging noise and vibration caused by the excitation of standing waves in closed side branches of a nuclear reactor system such as a BWR system as a result of steam flowing through the main steam line of the system.

2. Description of the Related Art

A BWR comprises a reactor vessel partially filled with water coolant which serves as a heat transfer medium. A reactor core containing nuclear fuel that generates heat is surrounded by the water coolant. A plurality of "jet" pumps are disposed within the vessel for increasing the velocity of the coolant through the reactor core in order to efficiently remove the heat generated by the nuclear fuel in the reactor core. The heat generated by the nuclear fuel is taken-up by the surrounding water, which is vaporized by the heat to produce steam. A main steam line conducts the steam from the vessel to a turbine-generator to produce electricity in a manner well known in the art. After the steam passes through the turbine-generator, it is piped to a condenser for condensing the steam into liquid water. The condensed water is returned to the reactor vessel by means of a coolant feed pipe for replenishing the water vaporized by the heat of the nuclear fuel.

BWR type nuclear power plants can, at times, experience the excitation of acoustic standing waves in closed side branches off the main stream line (such as a standpipe including a safety relief valve) as a result of steam flowing through the main steam line. More particularly, as steam flows down the main steam line, vortex shedding across the opening of the closed side branch causes acoustic standing waves to be excited in the closed side branch at the resonant frequency of the closed side branch. These acoustic standing waves create pressure fluctuations that propagate through the main steam line and cause degradation to the steam dryer and other equipment on the BWR, such as safety relief valves and turbine stop valves.

SUMMARY OF THE INVENTION

In one embodiment, a method of designing/making an acoustic side branch resonator structured to be coupled to a standpipe of a nuclear power plant is provided, wherein the acoustic side branch resonator includes a plurality of wire mesh elements for damping purposes. The method includes determining a resonant frequency of the standpipe, determining an active length of the acoustic side branch resonator using the resonant frequency, and determining a particular number of the wire mesh elements to be used in the acoustic side branch resonator and a pitch of each of the wire mesh elements using momentum and continuity equations of a compressible fluid.

In another embodiment, an acoustic side branch resonator structured to be coupled to a standpipe of a nuclear power plant is provided that includes a housing and means for coupling the housing to the standpipe, the housing and means for coupling being structured to define an "active" length for the acoustic side branch resonator, wherein the active length is determined using a resonant frequency of the standpipe, and a particular number of wire mesh elements provided within the housing, wherein the particular number of the wire mesh elements and a pitch of each of the wire mesh elements are determined using momentum and continuity equations of a compressible fluid. In the exemplary embodiment described herein, the "active" length of the acoustic side branch resonator corresponds to the length between the inner wall of the standpipe and the retainer spring which holds in place the wire mesh assembly. Therefore, the "active" length includes also the length of the weldolet or any other means or device used to couple the acoustic side branch to the standpipe. By "active" length it is intended the length necessary to match the resonant frequency of the standpipe, and where the propagation and absorption of the acoustic waves take place.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE EXEMPLARY EMBODIMENTS

Figure 1:
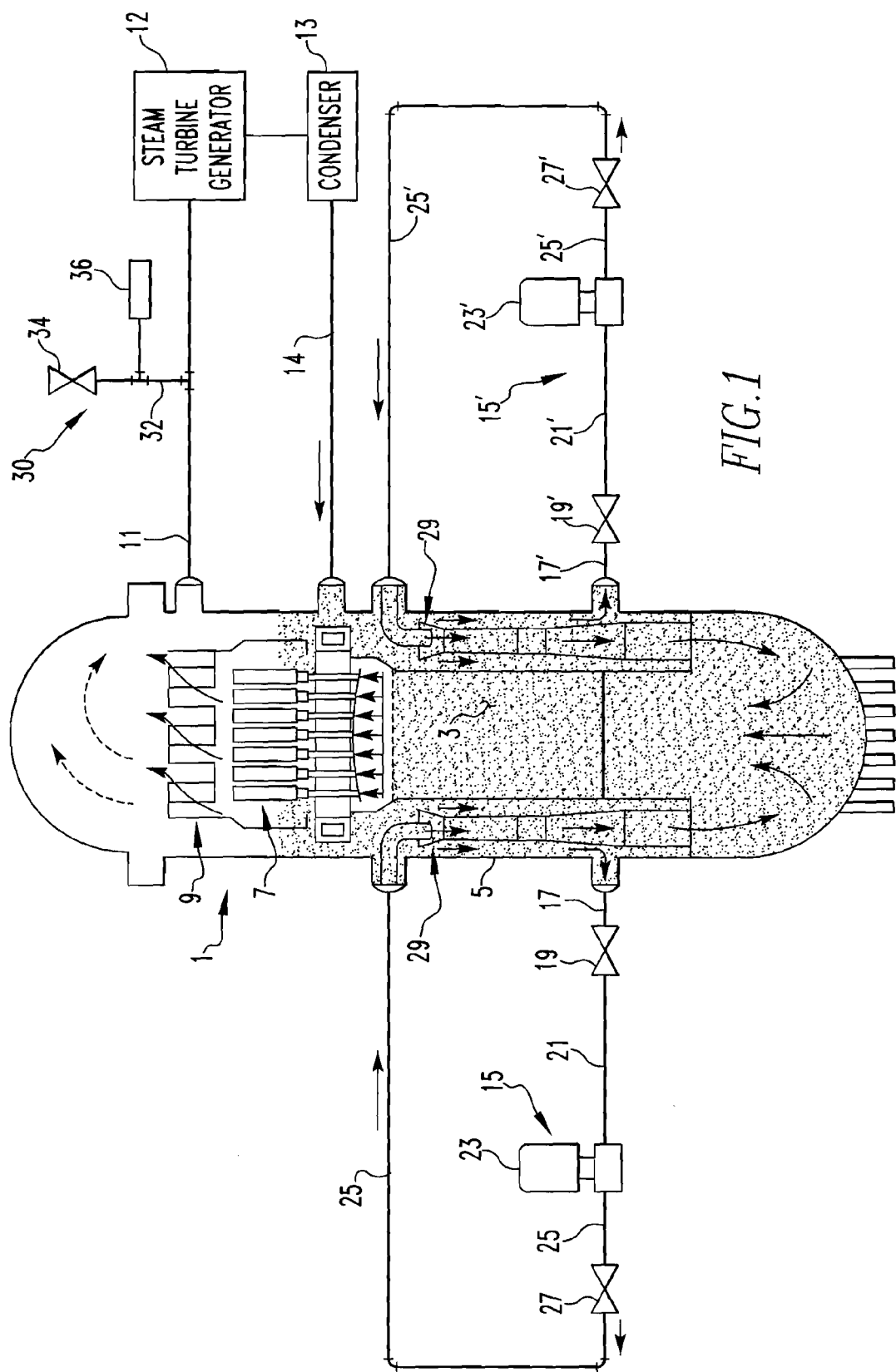
FIG. 1 is a schematic diagram of a boiling water reactor in which the present invention may be implemented according to one exemplary embodiment.

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

As employed, herein, the statement that two or more parts or components are "coupled" together shall mean that the parts are joined or operate together either directly or through one or more intermediate parts or components.

As employed herein, the statement that two or more parts or components "engage" one another shall mean that the parts exert a force against one another either directly or through one or more intermediate parts or components.

As employed herein, the term "number" shall mean one or an integer greater than one (i.e., a plurality).

FIG. 1 is a schematic diagram of a boiling water reactor 1 in which the present invention may be implemented according to one exemplary embodiment. Boiling water reactor 1 includes a nuclear core 3 within a pressure vessel 5. Also provided within pressure vessel 5 are stream separators 7 and steam driers 9. Coolant water is circulated upwardly through the core as indicated by the arrows, with the heat of the core producing saturated steam which is separated from recirculation water in stream separators 7. The steam is dried in steam driers 9 at the top of pressure vessel 5 and directed through a main steam line 11 to steam turbine generator 12. The steam, after use in steam turbine generator 12, is condensed in a condenser 13 and returned through a main feedwater line 14 to pressure vessel 5 for recirculation downwardly about reactor core 3 and then upwardly therethrough.

A plurality, usually two, recirculation loops 15, 15' are also provided to circulate coolant water and cool the reactor. Each recirculation loop 15, 15' comprises a line 17, 17' leading to first valve 19, 19', a line 21, 21' leading from the first valve 19, 19' to a recirculation pump 23, 23', and return lines 25, 25' from recirculation pump 23, 23', containing a second valve 27, 27', back to the pressure vessel 5. Jet pumps 29 are provided in pressure vessel 5 which mix the main feedwater with re-circulated coolant from the external recirculation pumps 23, 23'. The flow of coolant through the core 3 is the sum of the flow from the main feedwater line 13 and the recirculation flow from recirculation loops 15 and 15'.

In the illustrated embodiment, main steam line 11 includes at least one closed side branch 30 that includes a standpipe 32 off main steam line 11 having a safety relieve valve 34 and an acoustic side branch (ASB) resonator 36 coupled to standpipe 32. Safety relieve valve 34 provides overpressure protection for main steam line 11. As described in greater detail herein, the ASB resonator 36 modifies the as built standpipe 32, and effectively shifts the resonant frequency of standpipe 32 including safety relieve valve 34. As a result, standing waves, generated by the vortex shedding across the opening of closed side branch 30, are reduced or eliminated, thereby reducing or eliminating the degradation of components of boiling water reactor 1, such as steam driers 9. In addition, in the exemplary embodiment described herein, ASB resonator 36 is provided with mesh screens in order to provide a damping mechanism of the acoustic energy input into the system.

Figure 2:
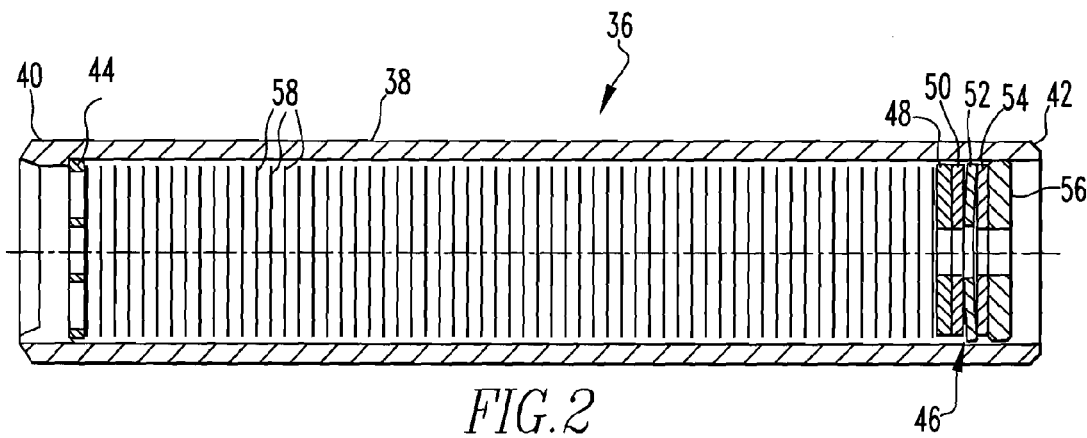
FIG. 2 is a cross-sectional view of an ASB resonator forming part of the boiling water reactor of FIG. 1 according to one exemplary embodiment of the present invention.
Figure 6:
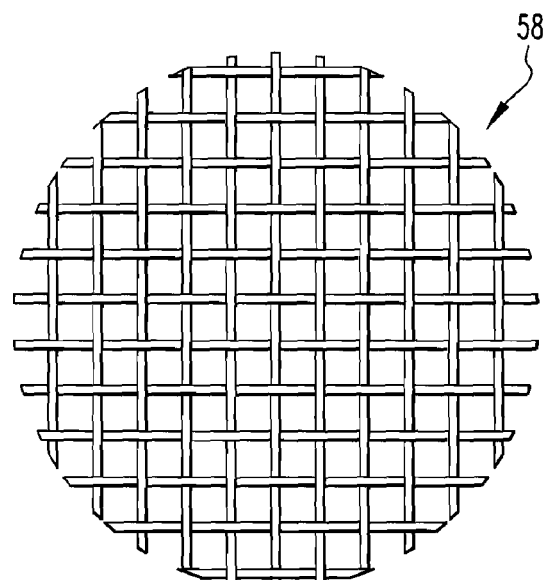
FIG. 6 is a front elevational view of a wire mesh element of the ASB resonator of FIG. 2 according to one exemplary embodiment.

FIG. 2 is a cross-sectional view of an ASB resonator 36 according to one exemplary embodiment of the present invention. ASB resonator 36 includes cylindrical housing 38 made of, for example and without limitation, ASME A106, Gr B, although other materials may also be used. Housing 38 includes a first end 40 and a second end 42 opposite first end 40. A foreign material exclusion (FME) barrier 44 is provided within housing 38 at first end 40. In the exemplary embodiment, FME barrier 44 is a circular plate having a number of orifices provided therein. A retaining assembly 46 is provided within housing 38 at second end 42. Retaining assembly 46 includes a screen compression plate 48, a flat washer 50, a spring washer 52, a flat washer 54, and a fixed screen plate 56. A number of wire mesh elements 58 are provided within housing 38 between FME barrier 44 and retaining assembly 46. In the exemplary embodiment, each wire mesh element 58 comprises a disk shaped screen member having an arrangement of interlocking or interwoven metal wires defining a number of evenly spaced, uniform small openings between the wires. A front elevational view of a wire mesh element 58 according to one exemplary embodiment is shown in FIG. 6. Each wire mesh element 58 will have a defined pitch associated with it, which is the number of wires per unit length (such as wires/inch). As will be appreciated, the pitch will determine the size and number of openings in the wire mesh element 58. As described elsewhere herein, wire mesh elements 58 provide a damping mechanism by increasing the viscous dissipation of the energy of acoustic waves introduced into housing 38 (ASB resonator 36 creates an additional cavity in closed side branch 30). By increasing the viscous dissipation mechanism using a number of wire-mesh disks (wire mesh elements 58), the energy of the acoustic waves is converted into heat. In the exemplary, non-limiting embodiment, items 44, 58, 48, 50, 54 and 56 are made of 316 or 304 stainless steel, and item 52 is made of Inconel X-75), although other materials may also be used.

Figure 3:
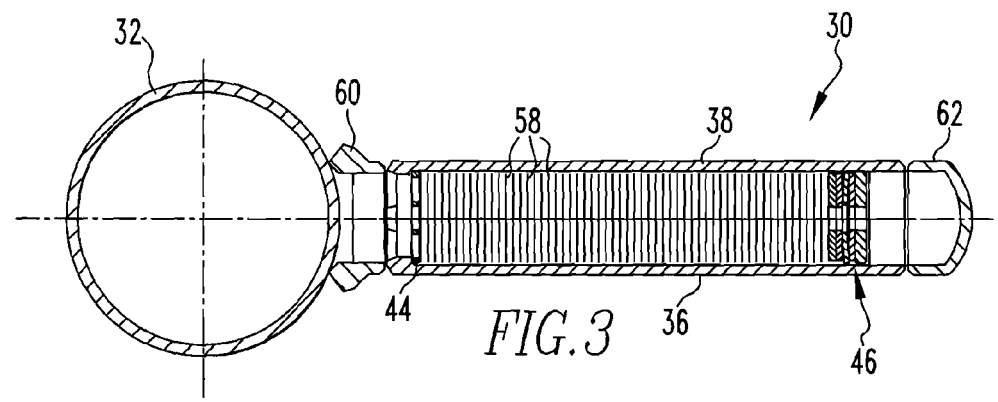
FIG. 3 is a top, cross-sectional view of a closed side branch forming part of the boiling water reactor of FIG. 1 according to one exemplary embodiment.

FIG. 3 is a top, cross-sectional view of closed side branch 30 according to one exemplary embodiment. As seen in FIG. 3, closed side branch 30 includes standpipe 32 and ASB resonator 36. ASB resonator 36 is coupled to standpipe 32 though a weldolet 60 that is attached to standpipe 32. In addition, a pipe cap 62 is provides at end 42 of housing 38 to close off housing 38. Ideally, ASB resonator 36 is coupled to standpipe 32 at the position along the length of standpipe 32 where the excited acoustic standing wave will be at a maximum, which is the top of the standpipe 32. However, in practice, space/clearance for components is often limited in a nuclear power plant, and thus the positioning of the ASB resonator 36 is often limited by space/clearance factors. As a result, the ASB resonator 36 should be placed as high as possible along the length of standpipe 32 given the particular space and clearance constraints in question.

In designing a particular ASB resonator 36, in order to effectively reduce or eliminate the excitation of the acoustic standing waves in closed side branch 30 and provide the desired damping effect (i.e., viscous dissipating effect), there are a number of key parameters that must be determined. Those parameters include: (1) the active length of the ASB resonator 36 (which in the exemplary embodiment includes the length of weldolet 60 and the housing 38), (2) diameter of the ASB resonator 36, and thus the diameter of the wire mesh elements 58, (3) the number of wire mesh elements 58 provided in housing 38, and (4) the pitch of the wire mesh elements 58. The diameter, number and pitch of the wire mesh elements 58 determines the damping effect they will provide.

The length of the ASB resonator 36 is important because it dictates the frequency at which the ASB resonator 36 will resonate. To be effective, the ASB resonator 36 must resonate at a frequency that is as close as practical to the frequency that is to be eliminated, which is the resonant frequency of the standpipe 32, i.e., the frequency of the acoustic standing waves that will be excited. The resonant frequencies for an ASB resonator 36 are given by:

$$f_0 = \frac{\left(n - \frac{1}{2}\right)c}{2L_e} \text{ for } n = 1, 2, 3...N, \quad (1)$$

where c is the speed of sound (in general this equation applies to an "open-closed" side-branch, where one side is open and the other is closed). In Equation (1), $L_e$ is the equivalent length of the side branch that accounts for the mass of gas that is accelerated at the opening of the side branch. The expression of $L_e$ for a flanged end side branch is given by:

$$L_e = L + \frac{8a}{3\pi}, \tag{2}$$

where a is the radius of the ASB resonator 36. In practice, the effect of adding the ASB resonator 36 to the system is to eliminate the resonant frequency due to the standpipe 32 by splitting it into lower and higher frequency components. Effectively, the overall dimensions of ASB resonator 36 can be calculated using several methodologies. As described below, the present invention in the exemplary embodiment employs the eigenvalue problem for a wave equation.

Figure 4:
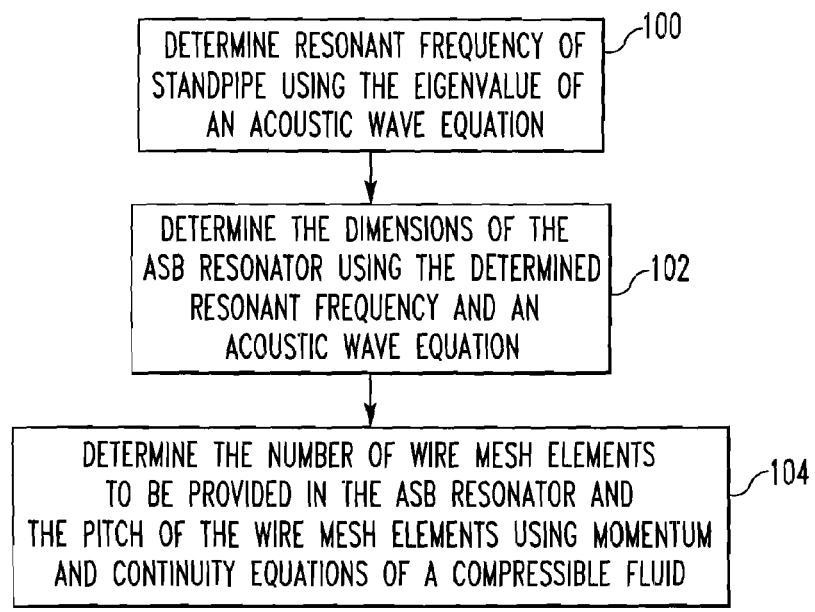
FIG. 4 is a flowchart illustrating a method of designing an ASB resonator for a nuclear reactor such as a boiling water reactor according to one exemplary embodiment of the present invention.

FIG. 4 is a flowchart illustrating a method of designing an ASB resonator 36 for a standpipe 32 of a nuclear reactor such as a boiling water reactor according to one exemplary embodiment of the present invention. Referring to FIG. 4, the method begins at step 100, wherein the resonant frequency of the standpipe 32 is determined using the eigenvalue of an acoustic wave equation. Next, at step 102, the dimensions of the ASB resonator 36 are determined using the just determined resonant frequency and an acoustic wave equation. The active length of the ASB resonator 36 is determined using Equation 1 and 2 (above). By doing so, the ASB resonator 36 and the standpipe 32 will be acoustically coupled, meaning the opening in the standpipe 32 to the ASB resonator 36 will not generate wave reflections, which means that the acoustic impedance of the ASB/standpipe system is almost zero. The diameter of the ASB resonator 36 is determined by optimizing the desired acoustic resistance using Equation 19 (below) and by meeting the criteria for installation of this component in a particular plant. This last criterion is based on the fact that installation may be hampered if an ASB resonator 36 with a very large diameter is fabricated. Also, note that the diameter should not exceed the standpipe's diameter, since it would be very difficult to install the ASB resonator 36 with standard pipe fittings in such a case.

In the exemplary embodiment, the length of the ASB resonator 36 is determined using the mono-dimensional wave equation with a variable term. In particular, the dimensions are determined based on the solution of the eigenvalue problem for the mono-dimensional wave equation with a variable area term. Then, at step 104, the number of wire mesh elements 58 to be provided in ASB resonator 36 and the pitch of the wire mesh elements 58 are determined using momentum and continuity equations of a compressible fluid. The number of wire mesh elements 58 and the pitch of the wire mesh elements 58 depends on the diameter of the ASB resonator 36, the type of fluid, and the acoustic frequency. Again this aspect is part of an optimization problem, where the diameter of the ASB resonator 36 is "guessed." Usually, a good guess is to use ½ the diameter of the standpipe, and then work your way through maximizing the transmission loss using Equation 22 as described below. The transmission loss given in Equation 22 is a curve which reaches a maximum for a certain acoustic resistance, which is the optimal resistance achieved for a certain diameter of the ASB resonator 36, fluid type, frequency, and number and pitch of wire mesh elements 58. Increasing the acoustic resistance to infinity may actually hurt the process since the transmission loss will go to zero and there is no wave dissipation in the ASB resonator 36. In this case, the ASB resonator 36 acts as a "wall" which reflects the wave back into the system. One particular methodology for performing step 103 of FIG. 4 is described below.

Figure 5:
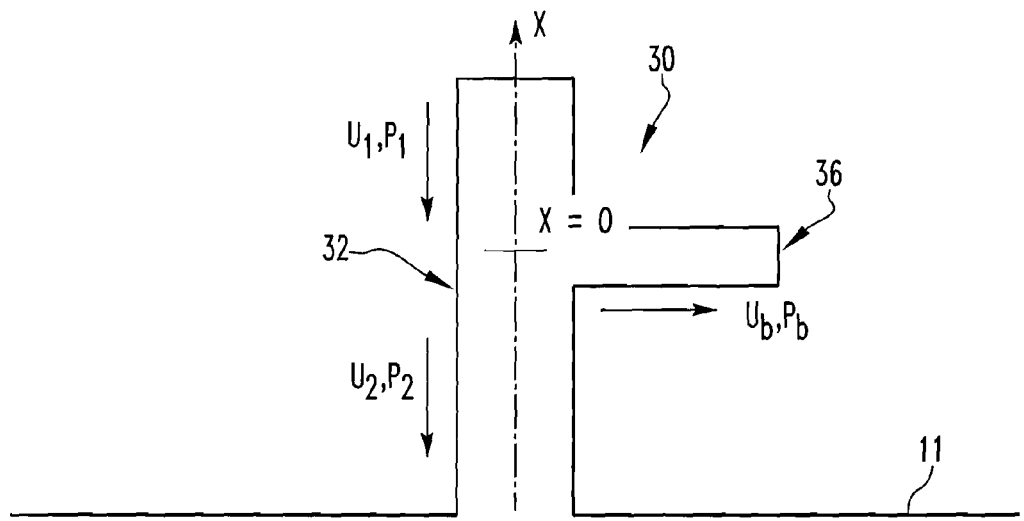
FIG. 5 is a schematic diagram showing a lumped parameter model of the ASB resonator shown in FIGS. 2 and 3.

In general, the mechanical resistance in a system is provided by a damper, often considered as a viscous or linear damper, in which the force on the damper is directly proportional to the velocity. An analogy can be established with acoustic systems, where the acoustic impedance, i.e., $R_A$, is defined in rayls, i.e., Ns/m$^3$. The acoustic resistance is a frequency dependent parameter defined as the ratio between the acoustic pressure and the particle velocity which produces in the medium. Based on this analogy, it is possible to develop a model that takes into account the acoustic resistance due to fluid viscosity and to a damping material introduced inside the ASB resonator 36. The closed side branch 30 can be described with a lumped parameter model as shown in FIG. 5. In FIG. 5, subscript 1 denotes upstream conditions, subscript 2 denotes downstream conditions, and subscript b denotes conditions for the ASB resonator 36.

Based on the system described in FIG. 5, the instantaneous acoustic pressure $p_1(t)$ in the standpipe 32 upstream of the ASB resonator 36 may be written as indicated in Equation (3) below.

$$p_1(t) = A_1 e^{i(\omega t - kx)} + B_1 e^{i(\omega t + kx)} \tag{3}$$

In Equation (3), the first term represents the incident sound wave at the junction (the connection point of ASB resonator 36 to standpipe 32), and the second term represents the sound wave reflected back toward the source, i.e., the top surface of the standpipe 32 where the maximum pressure is achieved.

In a similar way, the instantaneous acoustic pressure downstream of the junction is expressed in Equation (4) below, assuming that the energy reflected back beyond the junction is negligible.

$$p_2(t) = A_2 e^{i(\omega t - kx)} \tag{4}$$

The acoustic pressure at point x=0, as indicated in FIG. 5, must be the same for the three elements, i.e., continuity of pressure, as follows:

$$p_1(x=0) = p_2(x=0) = p_b \tag{5}$$

By introducing Equations (3) and (4) into Equation (5), we obtain the following identity evaluated at the junction point (see FIG. 5), i.e., x=0:

$$A_1 + B_1 = A_2 = p_b \tag{6}$$

The acoustic pressure in the branch (the ASB resonator 36) may be written in terms of the acoustic impedance of the ASB resonator 36 as follows:

$$p_b(t) = U_b(t) Z_{Ab} = U_b(t) \cdot (R_A + i X_A) \tag{7}$$

The volumetric flow rate upstream of the junction may be written in terms of the acoustic velocity $u_1(t)$ and the cross-sectional area, S, of the main tube (the standpipe 32):

$$U_1(t) = S u_1(t) = \left(\frac{S}{\rho_0 c}\right)[A_1 e^{i(\omega t - kx)} - B_1 e^{i(\omega t + kx)}] \tag{8}$$

Therefore, the volumetric flow rate downstream of the junction may be written in a similar way:

$$U_2(t) = S u_2(t) = \left(\frac{S}{\rho_0 c}\right) A_2 e^{i(\omega t - kx)} \tag{9}$$

At the junction (x=0 in FIG. 5), the Kirchoff principle can be applied similarly to an electric circuit; therefore, the sum of the entering currents/acoustic velocities must equal the sum of exiting currents/acoustic velocities at the node as follows:

$$U_1(x=0) = U_2(x=0) + U_b(x=0) \quad (10)$$

By introducing Equations (7), (8), and (9) into Equation (10), we obtain the following identity evaluated at the junction point (see FIG. 54-2), i.e., x=0:

$$\frac{S}{\rho_0 c}(A_1 - B_1) = \frac{S}{\rho_0 c} A_2 + \frac{p_b(t)}{(R_A + iX_A)} \quad (11)$$

By using the identity from Equation (6) into Equation (11), we obtain:

$$\frac{S}{\rho_0 c}(A_1 - B_1) = \frac{S}{\rho_0 c} A_2 + \frac{A_2}{(R_A + iX_A)} \quad (12)$$

From Equation (6), i.e., $B_1 = A_2 - A_1$, we can eliminate $B_1$ in Equation (12) as follows $$\frac{S}{\rho_0 c}(A_1 - A_2 + A_1) = \frac{S}{\rho_0 c} A_2 + \frac{A_2}{(R_A + iX_A)} \quad (13)$$

With some algebra, we arrive at Equation (14) below, which consists in the transfer function between the incident sound wave and the transmitted sound wave at the junction of the ASB resonator 36. This transfer function allows the calculation of the effectiveness of the ASB resonator 36 based on a transmission loss coefficient.

$$\frac{A_1}{A_2} = \frac{\frac{\rho_0 c}{2S} + R_A + iX_A}{R_A + iX_A} \quad (14)$$

The magnitude of this term is written as follows:

$$\left|\frac{A_1}{A_2}\right|^2 = \frac{\left(\frac{\rho_0 c}{2S} + R_A\right)^2 + X_A^2}{R_A^2 + X_A^2} \quad (15)$$

The sound power transmission coefficient, $a_t$, for the ASB resonator 36 is defined as the ratio of the sound power transmitted to the sound power incident on the junction and may be expressed as follows:

$$a_t = \frac{P_{tr}}{P_{in}} = \left|\frac{A_1}{A_2}\right|^2 = \frac{R_A^2 + X_A^2}{\left(\frac{\rho_0 c}{2S} + R_A\right)^2 + X_A^2} \quad (16)$$

The acoustic reactance for a closed tube, i.e., ASB resonator 36, can be defined as follows:

$$X_A = -\frac{\rho_0 c}{\pi a^2} \cot(kL_e) \quad (17)$$

where k is the wavenumber. The transmission loss, TL, for the muffler is related to the sound power transmission coefficient as shown in Equation (18) below. Note that the units in Equation (18) are decibels.

$$TL = 10 \log_{10}\left(\frac{1}{a_t}\right) \quad (18)$$

In many design situations, such as the ASB resonator 36 described herein, additional acoustic resistance in the form of mesh screens or other elements must be added to achieve a specified acoustic resistance. The total acoustic resistance $R_A$ is related to the specific acoustic resistance $R_S$ (resistance for a unit area) as follows:

$$R_A = \frac{\rho_0 c \sigma L + R_S}{\pi a^2} \quad (19)$$

Equation (19) is particularly useful to introduce the specific acoustic resistance based on the presence of screen layers and the energy dissipated due to the fluid friction within the tube, as expressed by the attenuation coefficient $\sigma$. The attenuation coefficient, $\sigma$, due to the fluid friction may be found from the following expression:

$$\sigma = \frac{\left(\frac{\pi f \mu_e}{\rho_0}\right)^{0.5}}{ac} \quad (20)$$

In Equation (20), the quantity $\mu_e$ is the effective viscosity for the gas, which includes the effect of heat conduction:

$$\mu_e = \mu\left[1 + \frac{(\gamma - 1)}{(\gamma Pr)^{0.5}}\right] \quad (21)$$

In Equation (21), the quantity $\mu$ is the viscosity of the gas, i.e., steam, $\gamma$ is the specific heat ratio, and Pr is the Prandtl number for the gas.

Introducing $N_s$ screen layers (i.e., $N_s$ wire mesh elements 58), the total specific acoustic resistance will be $R_s = N_s \cdot R_{s1}$, where $R_{s1}$ is specific acoustic resistance for one layer of mesh screen (i.e., one wire mesh element 58). Several values for $R_{s1}$ are shown in Table 1 provided below.

TABLE 1

Specific Acoustic Resistance for Different Types of Wire Mesh Elements 58

| Mesh Size (wires/inch) | Screen Thickness (in) | $R_{s1}$ (rayl, N-s/m$^3$) |
|---|---|---|
| 30 | 0.026 | 5.67 |
| 50 | 0.0173 | 5.88 |
| 65 | 0.0129 | 6.4 |
| 100 | 0.0091 | 9.1 |
| 120 | 0.0072 | 13.5 |
| 200 | 0.0045 | 24.6 |
| 325 | 0.0029 | 49.1 |

The sound power transmission loss coefficient (TL) for the ASB resonator 36 may be obtained by substituting the expressions for the acoustic reactance (Equation 17) and acoustic resistance (Equation 19) into Equation 16, wherein we obtain:

$$\frac{1}{a_t} = \frac{P_{in}}{P_{tr}} = \left|\frac{A_1}{A_2}\right|^2 = \frac{\left(\sigma L + \frac{R_S}{\rho_0 c} + \frac{\pi a^2}{2S}\right)^2 \tan(kL_e)^2 + 1}{\left(\sigma L + \frac{R_S}{\rho_0 c}\right)^2 \tan(kL_e)^2} \quad (22)$$

Thus, based on the particular methodology just described, the number and pitch of the wire mesh elements 58 may be determined by determining a desired total acoustic resistance $R_A$ for the ASB resonator 36 in the particular application. The number of the wire mesh elements 58 and the pitch of each of the wire mesh elements 58 may then be determined/chosen so that when the they are inserted into the housing 38 of the ASB resonator 36, the ASB resonator will have the desired total acoustic resistance $R_A$. In particular, each of the wire mesh elements 58 will have a specific acoustic resistance $R_{S1}$, and therefore the collection of the wire mesh elements 58 will have a total specific acoustic resistance $R_S$ equal to $R_{S1}$*the number of such elements ($N_s$). The pitch of each of the wire mesh elements 58 is specifically chosen to provide a specific acoustic resistance $R_{S1}$ such that $R_S$ will cause that ASB resonator 36 to have the desired total acoustic resistance based on desired total acoustic resistance $$R_A = \frac{\rho_0 c \sigma L + R_S}{\pi a^2}.$$

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment. In addition, the present invention may have application outside of the field of nuclear reactors, for example in fields such as, without limitation, coal-fired power plants.

What is claimed is:

1. A method of making an acoustic side branch resonator structured to be coupled to a standpipe, the acoustic side branch resonator including a plurality of wire mesh elements for damping purposes, the method comprising:
   determining a resonant frequency of the standpipe;
   determining an active length of the acoustic side branch resonator using the resonant frequency; and
   determining a particular number of the wire mesh elements to be used in the acoustic side branch resonator and a pitch of each of the wire mesh elements using momentum and continuity equations of a compressible fluid.

2. The method according to claim 1, further comprising inserting the particular number of the wire mesh elements each having the determined pitch into a housing of the acoustic side branch resonator.

3. The method according to claim 1, wherein the determining an active length of the acoustic side branch resonator comprises determining the active length of the acoustic side branch resonator using the resonant frequency and an acoustic wave equation.

4. The method according to claim 3, wherein the determining the active length of the acoustic side branch resonator using the resonant frequency and an acoustic wave equation comprises determining the active length of the acoustic side branch resonator using the resonant frequency and the mono-dimensional wave equation with a variable term.

5. The method according to claim 4, wherein the determining the length of the acoustic side branch resonator using the resonant frequency and the mono-dimensional wave equation with a variable term is based on a solution of the eigenvalue problem for the mono-dimensional wave equation with a variable area term.

6. The method according to claim 1, wherein the determining a resonant frequency of the standpipe comprises using the eigenvalue of an acoustic wave equation.

7. The method according to claim 1, wherein the determining the particular number and pitch of the wire mesh elements comprises determining a desired total acoustic resistance $R_A$ for the acoustic side branch resonator and choosing the particular number of the wire mesh elements and the pitch of each of the wire mesh elements such that when the particular number of the wire mesh elements each having the determined pitch are inserted into the housing of the acoustic side branch resonator the acoustic side branch resonator will have the desired total acoustic resistance $R_A$.

8. The method according to claim 7, wherein each of the wire mesh elements will have a specific acoustic resistance $R_{S1}$, wherein the particular number of the wire mesh elements will have a total specific acoustic resistance $R_S$ equal to $R_{S1}$*the particular number, and wherein the pitch of each of the wire mesh elements is chosen to provide specific acoustic resistance $R_{S1}$ such that $R_S$ will cause that acoustic side branch resonator to have the desired total acoustic resistance based on desired total acoustic resistance $$R_A = \frac{\rho_0 c \sigma L + R_S}{\pi a^2},$$

wherein $\rho_0$ is in the fluid density, c is the speed of sound, $\sigma$ is the attenuation coefficient due to fluid friction, L is the length of the acoustic side branch resonator, and a is a diameter of the acoustic side branch resonator.

9. The method according to claim 1, wherein each wire mesh element comprises a disk shaped screen member having an arrangement of interwoven metal wires defining a number of evenly spaced, uniform small openings between the wires.

10. An acoustic side branch resonator structured to be coupled to a standpipe, comprising:
    a housing and means for coupling the housing the standpipe, the housing and means for coupling being structured to define an active length for the acoustic side branch resonator, wherein the active length is determined using a resonant frequency of the standpipe; and
    a particular number of wire mesh elements provided within the housing, wherein the particular number of the wire mesh elements and a pitch of each of the wire mesh elements are determined using momentum and continuity equations of a compressible fluid.

11. The acoustic side branch resonator according to claim 10, wherein the active length is determined using the resonant frequency and an acoustic wave equation.

12. The acoustic side branch resonator according to claim 11, wherein the active length is determined using the resonant frequency and the mono-dimensional wave equation with a variable term.

13. The acoustic side branch resonator according to claim 11, wherein the active length is based on a solution of the eigenvalue problem for the mono-dimensional wave equation with a variable area term.

14. The acoustic side branch resonator according to claim 10, wherein the resonant frequency of the standpipe is determined using the eigenvalue of an acoustic wave equation.

15. The acoustic side branch resonator according to claim 10, wherein the particular number and pitch of the wire mesh elements are determined by determining a desired total acoustic resistance $R_A$ for the acoustic side branch resonator and choosing the particular number of the wire mesh elements and the pitch of each of the wire mesh elements such that when the particular number of the wire mesh elements each having the determined pitch are inserted into the housing of the acoustic side branch resonator the acoustic side branch resonator will have the desired total acoustic resistance $R_A$.

16. The acoustic side branch resonator according to claim 15, wherein each of the wire mesh elements will have a specific acoustic resistance $R_{S1}$, wherein the particular number of the wire mesh elements will have a total specific acoustic resistance $R_S$ equal to $R_{S1}$*the particular number, and wherein the pitch of each of the wire mesh elements is chosen to provide specific acoustic resistance $R_{S1}$ such that $R_S$ will cause that acoustic side branch resonator to have the desired total acoustic resistance based on desired total acoustic resistance $$R_A = \frac{\rho_0 c \sigma L + R_S}{\pi a^2},$$

wherein $\rho_0$ is fluid density, c is the speed of sound, $\sigma$ is the attenuation coefficient due to fluid friction, L is the length of the acoustic side branch resonator, and a is a diameter of the acoustic side branch resonator.

17. The acoustic side branch resonator according to claim 10, wherein each wire mesh element comprises a disk shaped screen member having an arrangement of interwoven metal wires defining a number of evenly spaced, uniform small openings between the wires.

\* \* \* \* \*